(12) United States Patent
Leuver et al.

(10) Patent No.: US 8,790,018 B2
(45) Date of Patent: Jul. 29, 2014

(54) DRUM MOTOR HAVING AN INNER AND AN OUTER COVER

(75) Inventors: Helmut Leuver, Mönchengladbach (DE); Frank Heinen, Jülich (DE); Martin Priefert, Wegberg (DE)

(73) Assignee: Interroll Holding AG (CH)

( * ) Notice: Subject to any disclaimer, the term of this patent is extended or adjusted under 35 U.S.C. 154(b) by 249 days.

(21) Appl. No.: 13/319,982

(22) PCT Filed: May 20, 2010

(86) PCT No.: PCT/EP2010/056969
§ 371 (c)(1),
(2), (4) Date: Feb. 13, 2012

(87) PCT Pub. No.: WO2010/133670
PCT Pub. Date: Nov. 25, 2010

(65) Prior Publication Data
US 2012/0134610 A1    May 31, 2012

(30) Foreign Application Priority Data

May 20, 2009 (DE) .......................... 10 2009 022 250

(51) Int. Cl.
| | |
|---|---|
| *F16C 13/02* | (2006.01) |
| *F16C 33/78* | (2006.01) |
| *B65G 39/09* | (2006.01) |
| *F16C 19/22* | (2006.01) |

(52) U.S. Cl.
USPC ........... 384/546; 384/477; 384/559; 384/562; 384/567; 384/587; 474/199

(58) Field of Classification Search
CPC ........ B65G 39/09; B65G 13/00; F16C 13/022
USPC ......... 384/480, 543, 546, 548, 559, 586–587; 198/780, 788–789, 842; 474/199; 193/37; 29/428, 505, 525
See application file for complete search history.

(56) References Cited

U.S. PATENT DOCUMENTS

| | | |
|---|---|---|
| 1,780,493 A | 11/1930 | McKee |
| 3,313,168 A * | 4/1967 | Matthews ...................... 474/199 |

(Continued)

FOREIGN PATENT DOCUMENTS

| | | |
|---|---|---|
| DE | 735959 | 6/1943 |
| DE | 1842769 | 11/1961 |

(Continued)

*Primary Examiner* — Marcus Charles
(74) *Attorney, Agent, or Firm* — Clark Hill PLC (57) ABSTRACT

The invention comprises a drum motor comprising a drum tube, a spatially fixed shaft in the interior of the drum tube. To provide a drum motor in particular for use in hygiene areas a drum motor (10) according to the invention comprises: a drum tube (11), a spatially fixed shaft (13) in the interior of the drum tube (11), an inner cover (13) for accommodating a bearing (14) to support the drum tube (11) rotatably about the shaft (13) and for internally sealing off the interior (12), and an outer cover (30) for covering a drum tube end and for externally sealing off the interior (12).

8 Claims, 5 Drawing Sheets

(56) References Cited

U.S. PATENT DOCUMENTS

| | | | |
|---|---|---|---|
| 5,022,132 A * | 6/1991 | Valster et al. | 198/842 |
| 5,261,528 A * | 11/1993 | Bouchal | 384/480 |
| 6,234,293 B1 * | 5/2001 | Fasoli | 193/37 |
| 6,287,014 B1 * | 9/2001 | Salla | 384/546 |
| 6,755,299 B2 * | 6/2004 | Itoh et al. | 198/780 |
| 6,814,213 B2 * | 11/2004 | Dyson et al. | 384/480 |
| 7,581,630 B2 * | 9/2009 | Hong | 198/842 |
| 7,661,519 B2 * | 2/2010 | Hong | 193/37 |
| 8,146,733 B2 * | 4/2012 | Fox | 198/780 |
| 2004/0108189 A1 * | 6/2004 | Itoh et al. | 198/788 |

FOREIGN PATENT DOCUMENTS

| | | |
|---|---|---|
| DE | 1192584 | 5/1965 |
| DE | 2322171 | 11/1973 |
| DE | 19639091 A1 | 9/1996 |
| DE | 29611097 | 10/1996 |
| DE | 19527082 A1 | 1/1997 |
| DE | 19615709 A1 | 10/1997 |
| DE | 19618248 C1 | 10/1997 |
| DE | 10 2006 057461 A1 | 6/2008 |
| GB | 2241558 A | 4/1991 |

\* cited by examiner

DRUM MOTOR HAVING AN INNER AND AN OUTER COVER

BACKGROUND OF THE INVENTION

The invention concerns a drum motor comprising a drum tube and a spatially fixed shaft in the interior of the drum tube, an outer cover for closing off a drum tube end and a method of assembling a drum motor.

A drum motor has a drum tube and a spatially fixed shaft in the interior of the drum tube. Usually arranged in the interior of the drum tube is a drive for driving the drum tube in relation to the spatially fixed shaft so that the drum tube rotates about the axis. Drum motors are also known which have an external gear motor for driving the drum tube with respect to the shaft.

Drum motors are preferably used to cause movement of a belt laid around the drum tube. An arrangement of at least one drum motor and a belt guided therearound serves for example as a running belt or conveyor belt.

The drum tube is mounted rotatably with respect to the spatially fixed shaft. Oil is usually disposed in the interior of the drum tube, serving to lubricate the bearing and also the drive motor arranged for example in the interior of the drum tube. The ends of the tube are correspondingly closed with a respective cover to keep the oil in the interior of the drum tube.

DE 195 27 082 C2 discloses a design configuration of such a cover. In accordance with DE 195 27 082 C2 a cylindrical sleeve is fitted to the inside surface of the drum tube by a connection involving intimate joining of the materials involved, and the cover is introduced into the sleeve in positively locking relationship. Arranging the cover in the drum tube or in the sleeve can thus be implemented as the last assembly step.

Drum motors are used for example in industrial sectors in which particular hygiene demands are made on the drum motor. Suitable design configurations for the cover are required, which can be for example a galvanised steel cover, an anodised aluminum cover or a cover of stainless steel. [0007] DE 296 23 889 U1 discloses a cover suitable for use in the foodstuff industry or the pharmaceutical industry. The cover of DE 296 23 889 U1 is provided with a cap of stainless high-quality steel to comply with the hygiene requirements, but to save on that material which would be required for a solid cover of for example stainless high-quality steel.

Drum motors are also known in the hygiene field, which have plate covering members of high-quality steel at the ends of the drum tube.

The object of the invention is to provide a drum motor which is better adapted to the hygiene demands.

BRIEF SUMMARY OF THE INVENTION

According to the invention the object is attained by a drum motor comprising a drum tube, a spatially fixed shaft in the interior of the drum tube, an inner cover for accommodating a bearing to support the drum tube rotatably about the shaft and for internally sealing off the interior, and an outer cover for covering a drum tube end and for externally sealing off the interior.

The drum motor according to the invention is based on the idea that the drum motor cover is of a two-part structure. In that case the inner cover disposed in the interior of the drum tube performs the function of providing support and preventing oil from escaping from the interior of the drum tube. The outer cover serves for covering over the end of the drum tube and prevents dust, contamination etc. from the space outside the drum motor from being able to pass into the interior. The outer cover preferably serves as a modular outer cover which, depending on the respective hygiene requirement or area of use of the drum motor, is interchangeable without modifications being required in the interior of the drum tube such as for example draining off the oil.

An advantage of the drum motor according to the invention is that it is only after the assembly of drum tube, shaft and inner cover, that it can then be decided which outer cover is particularly suitable for the area of use of the drum motor. To replace the outer cover it is only necessary to release the outer cover from the drum motor without for example oil being able to escape from the interior of the drum tube. Therefore the outer cover can be replaced at any time and without major assembly complication and expenditure, for example for cleaning purposes. That is particularly advantageous in regard to hygiene demands on a drum motor. [0013] Advantageously, it is possible to decide after assembly of the motor, which configuration the drum motor is to involve in regard to hygiene, corrosion resistance and material choice for the cover or covers. That provides a particularly maintenance-friendly and/or hygienic drum motor.

Preferably the drum motor and/or the inner cover has a fixing means, in particular a thread, for in particular releasable arrangement of the outer cover on the inner cover. Preferably the outer cover is fixed or arranged releasably on the drum motor. Preferably the outer cover is arranged on the inner cover. The arrangement or fixing of the outer cover on the drum motor according to the invention is preferably implemented by a fixing means. Such a fixing means is preferably a thread or screw mechanism, a clamping mechanism, a snap-action or clipping mechanism or the like. The fixing means is preferably adapted to arrange the outer cover releasably on the drum motor according to the invention and/or the inner cover. Particularly preferably the outer cover is screwed on to the inner cover. Preferably the thread for that purpose is arranged at an inwardly disposed location, that is to say between the inner and outer covers, and does not cause any interruptions or unevenness at the outside (for example due to screws) in the smooth external contour, which is particularly advantageous in the hygiene area (for example no contamination or impurities clinging thereto, and simple and reliable cleaning). The cleanability of the motors and thus the aspect of bacterial contamination is considerably improved according to the invention. One or more of those preferred configurations advantageously provides that the outer cover can be particularly easily and/or releasably arranged on the drum motor according to the invention.

Preferably the inner cover has at least one oil hole. In particular it is preferable for the inner cover to have at least two oil holes. The oil hole is adapted to introduce oil into the interior of the drum tube and/or to remove oil from the interior of the drum tube. Refilling with oil, an oil change, an oil check, an oil level check and the like can be particularly easily effected by means of the oil hole.

Preferably the oil hole has a thread for receiving a sealing screw, it is further preferred if the drum motor according to the invention has a sealing screw which in particular is screwed in sealing relationship in the oil hole.

Advantageously the configuration of the oil hole with a thread or fitting the sealing screw in the thread of the oil hole provides that the oil hole can be opened and closed in a particularly simple fashion and reliably prevents oil from flowing out of the interior of the drum tube. If required the sealing screw can advantageously be removed at any time in order for example to remove oil from the interior of the drum tube or to introduce oil thereinto.

Preferably the drum motor has a sealing element arranged sealingly in the oil hole. A sealing element can be for example a sealing screw or also a plug, a sealing wedge or another element which prevents the oil from escaping from the interior of the drum tube through the oil hole.

Preferably the outer cover has a radial periphery substantially corresponding to the radial periphery of the drum tube. Preferably the radial periphery of the outer cover, in conjunction with the surface of the drum tube, forms a cylindrical surface of the drum motor. The cylindrical surface of the drum motor is in particular smooth so that it is possible substantially to prevent contamination from passing into the interior of the drum motor between the drum tube and the outer cover. The fact that the outer cover, in conjunction with the drum tube, is in the form of a cylindrical surface of the drum motor affords the advantage that the surface of the drum motor can be particularly easily and reliably cleaned.

Preferably the outer cover has a smooth surface. Preferably the outer surface of the outer cover, that is to say the surface which is in opposite relationship to the interior of the drum tube, and which closes the interior of the drum tube, is smooth. The smooth configuration of the outer cover permits particularly easy cleaning. In that way, the drum motor is designed in such a fashion that there are no recesses or dirt pockets in the cover region of the drum motor according to the invention, such as for example screw heads on the screws which serve for conventionally fixing the cover, without having to forego the possibility of the oil change and/or a change in the seal.

Preferably the drum motor has an outer sealing ring between the outer cover and the drum tube. The outer sealing ring has the advantage that it is possible to prevent contamination from passing from the space outside the motor into the interior of the drum motor according to the invention. The sealing ring also improves the possibility of cleaning the surface of the drum motor as the sealing ring prevents a cleaning agent or a cleaning fluid from being able to penetrate into the interior of the drum motor. Preferably the sealing ring is activated, that is to say pressed, by activation of the fixing means. Preferably the sealing ring is activated by arranging the outer cover on the drum motor according to the invention. Particularly preferably activation of the sealing ring is effected by screwing the outer cover on to the drum motor and/or on to the inner cover. Advantageously that provides that fixing of the outer cover to the drum motor and externally sealing off the interior of the motor are effected at the same time.

Preferably the drum motor has a sealing ring between the inner cover and the shaft. Preferably the sealing ring is a Simmerring oil seal. The sealing ring serves for sealing off the drum motor housing on the shaft. The sealing ring in particular prevents the fluid or oil from issuing from the interior of the drum tube, that is to say the sealing ring serves for internal sealing integrity. Preferably the inner cover has an opening in which the sealing ring is arranged. The sealing ring achieves the advantage of particularly good sealing integrity in respect of the interior so that a discharge of oil at the shaft can be substantially prevented.

Preferably the drum tube, on its surface in opposite relationship to the interior, has a coating, in particular a rubber coating. The surface of the drum tube, that is in opposite relationship to the interior, is the outer surface of the drum tube or the drum motor. Depending on the respective area of use of the drum motor according to the invention the outer, in particular cylindrical surface of the drum motor is adapted for example to drive a belt. The friction can be set by a suitable choice for the coating. There are for example rubber coatings which are suitable for use with foodstuffs and which are oil- and grease-resistant, and rubber coatings with smooth or structured surfaces or guide grooves. Preferably the radial periphery of the outer cover substantially corresponds to the radial outer periphery of the coating, that is to say the radial periphery of the drum motor according to the invention. Advantageously applying a coating to the surface of the drum motor provides that the drum motor can be adapted for special areas of use.

Preferably the outer cover has a projection for engagement into the coating. Preferably the coating has an opening adapted to receive the projection of the outer cover. Preferably the outer cover has an annular projection suitable for engaging into an annular groove in the coating. A particularly advantageous external sealing effect is achieved by the at least partial interengagement of a radial peripheral region of the outer cover into the coating.

Preferably the drum motor has a ball bearing between the shaft and the inner cover. Particularly preferably the inner cover has an opening for accommodating the bearing, in particular the ball bearing. Particularly preferably the inner cover has an opening for accommodating the sealing ring and an opening for accommodating the bearing so that the inner cover together with the sealing ring and the bearing can be arranged in the interior of the drum tube in one assembly step. Preferably the inner cover is in the form of a drive output cover which serves for supporting the drum tube with respect to the spatially fixed shaft. Preferably the inner cover is connected to the inner surface of the drum tube by a connection involving intimate joining of the materials concerned. Particularly preferably the inner cover is glued and/or welded to the inside surface of the drum tube. Arranging a ball bearing between the shaft and the inner cover advantageously provides that the inner cover performs the function of supporting the drum tube relative to the spatially fixed shaft. [0026] Preferably the drum motor has a sealing lip between the outer cover and the shaft. Preferably the sealing lip has at least one inner radial region which is rotatable about the outer radial periphery of the shaft. Preferably the sealing lip is adapted to seal off the sealing ring outwardly. Preferably the sealing lip is adapted for sliding around the shaft during rotation of the drum tube about the shaft. The sealing lip has the advantage that external sealing integrity can be further improved to prevent contamination from passing from the space outside the motor into the interior thereof.

Preferably the outer cover is sealed off in gap-free relationship both with respect to the inner cover and also with respect to the shaft or axle and also with respect to the drum tube. Sealing integrity as between the outer cover and the inner cover is preferably implemented by the fixing means, in particular the thread, or by screwing the outer cover on to the inner cover. Sealing integrity between the outer cover and the shaft or axle is preferably implemented by the sealing lip. Sealing integrity between the outer cover and the drum tube preferably involves the outer sealing ring and/or the projection of the outer cover into the optional coating. The advantageous gap-free sealing effect is ensured by the defined position of the outer cover by virtue of the screwed construction and thus by a defined pressure on the seals, in particular the sealing lip and the outer seal. According to the invention cleanability of the motors and thus the aspect of bacterial contamination is considerably improved.

Preferably the shaft is a hollow shaft. Such a con-figuration is particularly advantageous to pass supply units such as for example cables from outside the drum motor to the motor in the interior of the drum motor.

In a further aspect the invention relates to a drum motor comprising a drum tube, a spatially fixed shaft in the interior of the drum tube, an inner cover for accommodating a bearing for supporting the drum tube rotatably about the shaft and for internally sealing off the interior, and means for accommodating an outer cover according to the invention. [0030] In a further aspect the invention relates to an outer cover according to the invention for use in a drum motor according to the invention.

In a further aspect the invention concerns a method of assembling a drum motor which has a drum tube and a spatially fixed shaft in the interior of the drum tube, wherein the method comprises the steps: fixing an inner cover between the drum tube and the shaft, wherein the inner cover is adapted to accommodate a bearing to support the drum tube rotatably about the shaft and to internally seal off the interior, wherein the inner cover has an oil hole, filling oil into the interior of the drum tube through the oil hole, sealing off the oil hole, and fixing an outer cover to the drum motor, wherein the outer cover is adapted to cover a drum tube end and to externally seal off the interior of the drum tube.

BRIEF DESCRIPTION OF THE SEVERAL VIEWS OF THE DRAWINGS

Embodiments of the invention are described hereinafter with reference to the Figures in which.

DETAILED DESCRIPTION OF THE INVENTION

Figure 1:
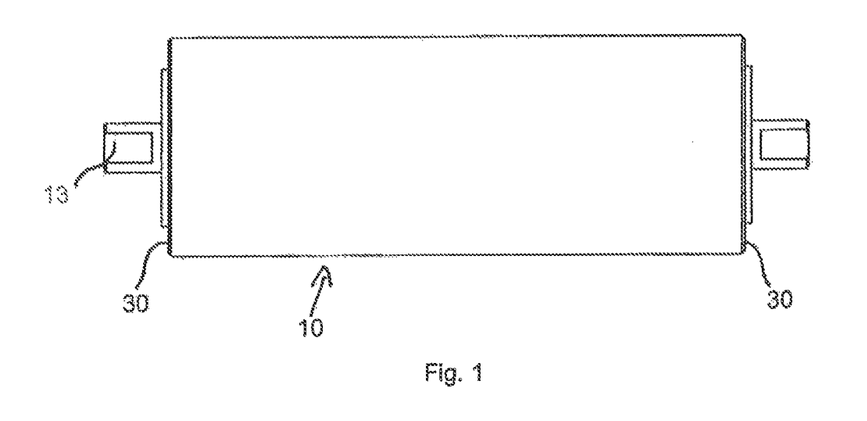
FIG. 1 shows an external overall view of a drum motor.

FIG. 1 shows an external view of a drum motor 10, in the interior of which is arranged a spatially fixed shaft 13. Outer covers 30 are arranged at the two ends of the drum motor 10. It is however also possible for the outer cover 30 according to the invention to be arranged only at one end of a drum motor 10. Arranged in the interior of the drum motor 10 for example is a transmission, the movement of which is converted into a movement of the drum tube 11 with respect to the stationary shaft.

FIGS. 2 through 6 show embodiments of non-rubber-coated tubes 11 with a seal.

Figure 2:
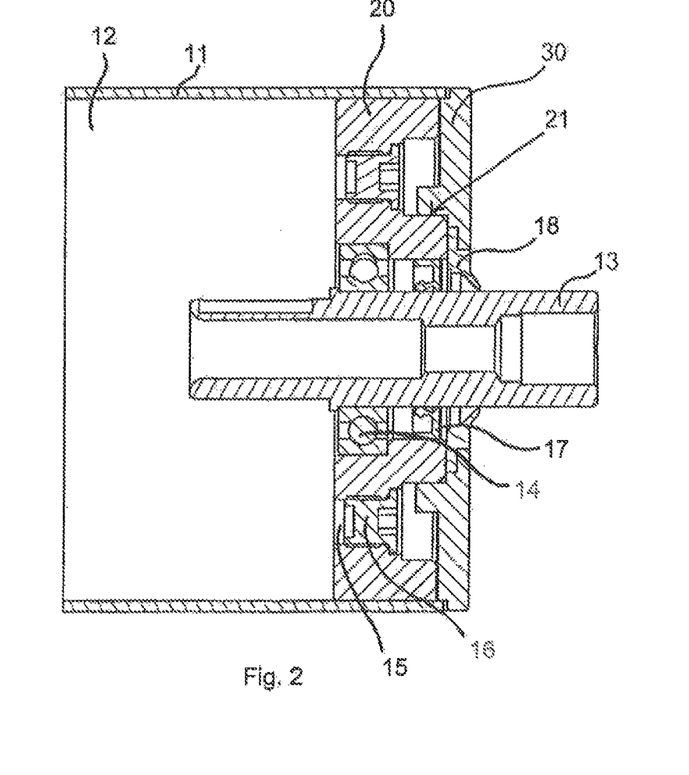
FIG. 2 shows a cross-section through an end region of a drum motor according to the invention.
Figure 3:
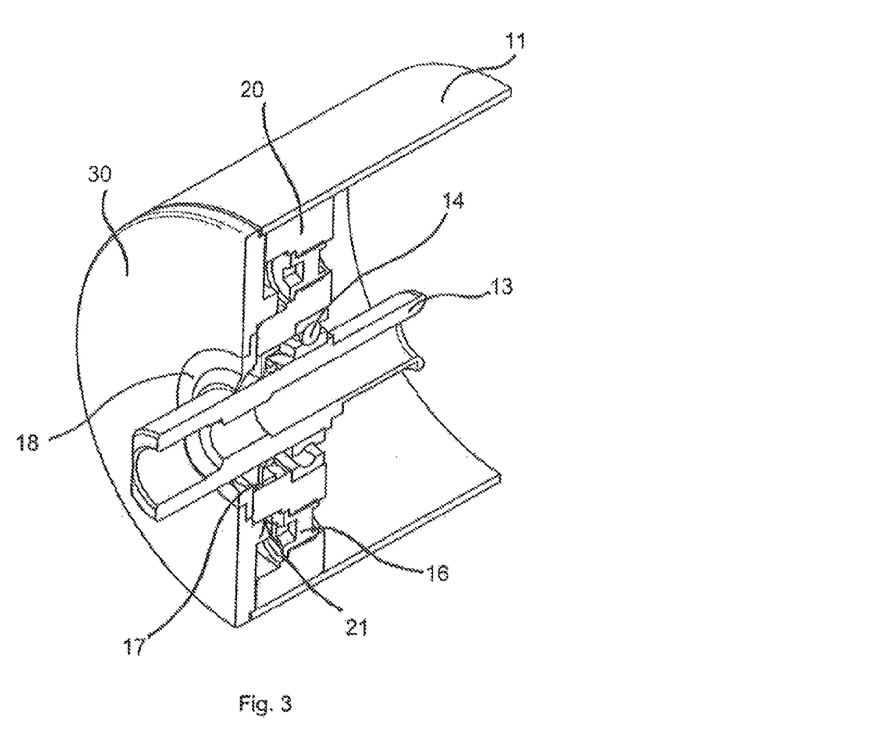
FIG. 3 shows a cross-section through an end region of a drum motor according to the invention.

FIGS. 2 and 3 show a first embodiment of a drum motor according to the invention. The drum motor according to the invention has a drum tube 11 which encloses an interior 12 of the drum tube 11 or the drum motor 10. Arranged in the interior of the drum tube 11 is a spatially fixed shaft 13 which is preferably in the form of a hollow shaft, as shown in FIGS. 2 and 3. Arranged between the drum tube 11 and the hollow shaft 13 is the two-part cover according to the invention, comprising an inner cover 20 and an outer cover 30. The inner cover 20 and the outer cover 30 are arranged against each other. The outer cover 30 in the embodiment of FIGS. 2 and 3 is screwed on to the inner cover 20 by means of the thread 21. Alternatively or additionally the outer cover 30 can be screwed on to the drum tube 11. Instead of screwing the outer cover 30 to the inner cover 20 and/or the drum tube 11 clamping, snap-action mounting, clipping mounting or another fixing mechanism is possible.

The inner cover 20 supports the drum tube 11 with respect to the hollow shaft 13 by means of a ball bearing 14. The drum tube 11 is arranged rotatably about the spatially fixed hollow shaft 13 by means of the ball bearing 14. In that case the inner cover 20 serves as a drive output cover for transmitting the output of the drive (not shown) to the drum tube 11. The inner cover 20 is fixedly connected to the drum tube 11 to translate the rotary movement of the inner cover 20 into a rotation of the drum tube 11. The inner cover 20 is for example glued or welded to the inside surface of the drum tube 11.

The inner cover 20 further has an opening for accommodating a sealing ring 17 in the form of a soft seal. In the embodiment of FIGS. 2 and 3 the sealing ring is in the form of a Simmerring or oil ring seal 17. The Simmerring 17 serves for internal sealing integrity, that is to say it prevents a fluid in the interior of the drum tube 11 from issuing.

The inner cover 20 of the embodiment of FIGS. 2 and 3 has two oil holes 15. The oil holes 15 are provided with a female thread into which sealing screws 16 are sealingly screwed. Upon assembly of the drum motor 10 according to the invention the inner cover 20 is fixed between the drum tube 11 and the hollow shaft 13, thereafter the fluid, in particular oil, is introduced into the interior 12 through the oil holes 15, thereafter the oil holes 15 are closed by fixing the sealing screws 16 in place and finally the outer cover 30 is arranged at the drum tube end.

Arranged between the outer cover 30 and the hollow shaft 13 in the embodiment of FIGS. 2 and 3 is a sealing lip 18 which serves for external sealing and prevents contamination and fouling from passing into the interior 12 from the outside. Sealing integrity between the outer cover 30 and the drum tube 11 is achieved by means of a sealing ring 31, as is further described hereinafter.

Figure 4:
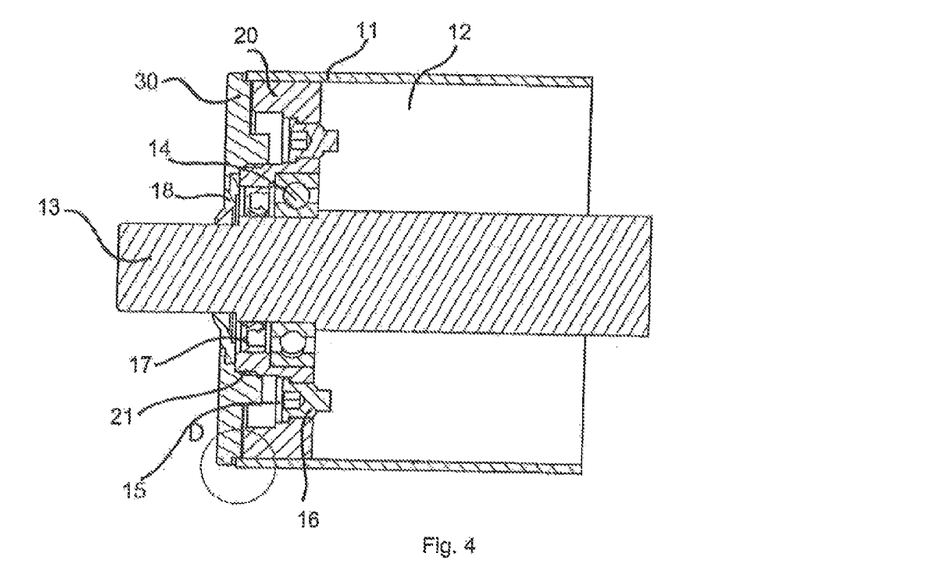
FIG. 4 shows a cross-section through an end region of a drum motor according to the invention.
Figure 5:
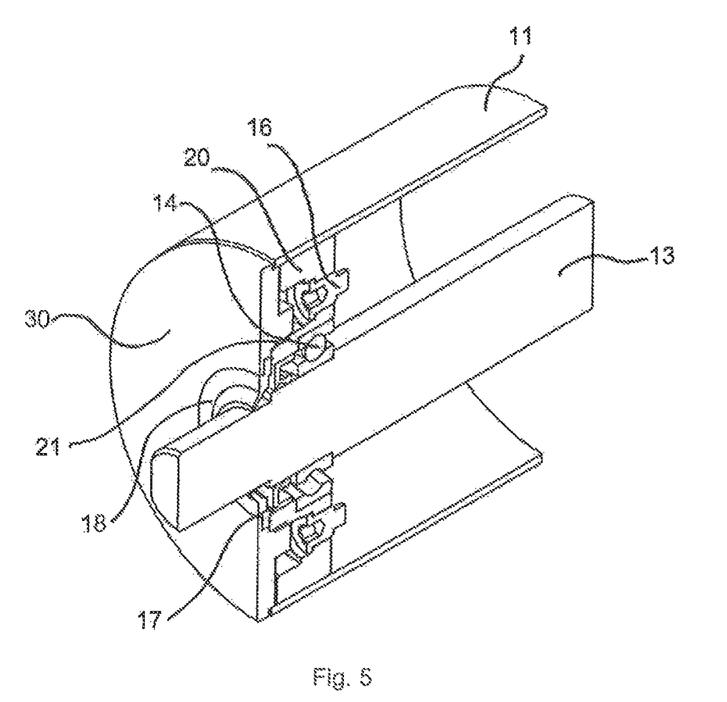
FIG. 5 shows a cross-section through an end region of a drum motor according to the invention.
Figure 6:
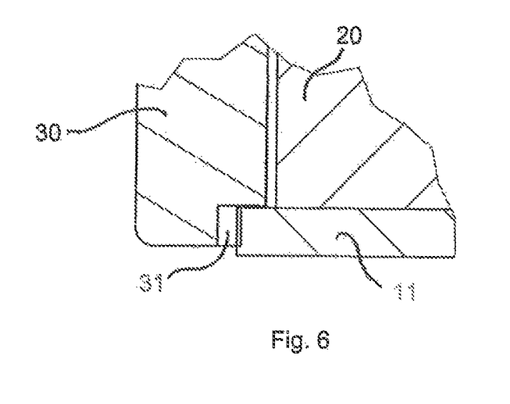
FIG. 6 shows a detail view of the drum motor of FIG. 4.

FIGS. 4 through 6 show a further embodiment of a drum motor 10 according to the invention. In the embodiment of FIGS. 4 through 6 the shaft is solid and is not in the form of a hollow shaft as in FIGS. 2 and 3. Such a design configuration can be advantageous if the drive is arranged for example in the space outside the drum motor 10 and therefore there is no need for supply lines to be passed through the hollow shaft. The cylindrical surface of the shaft 13 also has ring-shaped steps which prevent displacement of the drum tube and components arranged in the interior thereof with respect to the shaft 13. The embodiment in FIGS. 4 through 6 has a fixing element 16 which for example is in the form of a plug to close the oil holes 15. The inner cover 20 and the outer cover 30 can be connected together by means of a thread 21. The Simmerring 17 prevents oil issuing from the interior 12. The sealing lip 18 prevents contamination from passing into the interior 12.

FIG. 6 shows a detail view of the region D in FIG. 4. The embodiment of FIGS. 2 and 3 is of a similar configuration in the transitional region between the drum tube 11 and the outer cover 30, as shown in FIG. 6. FIG. 6 shows the inner cover 20 which is fixed to the inside surface of the drum tube 111, in particular by a connection involving intimate joining of the materials concerned. The outer cover 30 is arranged at the drum tube 11 and the inner cover 20. An external seal between the outer cover 30 and the drum tube 11 and/or the inner cover 20 is afforded by means of an external sealing ring 31. The sealing effect of the external sealing ring 31 is activated by the outer cover 30 being arranged on the drum tube 11, in which case the sealing action of the external sealing ring 31 becomes progressively greater, the correspondingly smaller the spacing between the outer cover 30 and the drum tube 11. The spacing between the outer cover 30 and the drum tube 11 is preferably adjusted by means of the fixing means 21; the tighter the outer cover 30 is screwed for example with the drum tube 11 and the inner cover 20 respectively, the correspondingly greater is the sealing action of the external sealing ring 31.

FIGS. 7 through 10 show a further embodiment of a drum motor 10 according to the invention for a rubber-coated tube 11 with a cut edge. The outer cover 30 for rubber-coated drum tubes 11 provides the sealing integrity in relation to the drum tube 11 by a definedly placed sealing edge as described hereinafter with reference to FIGS. 7 through 9. In other respects the features of the embodiment of FIGS. 7 through 10 are or can be identical to those of the non-rubber-coated drum tube of FIGS. 1 through 6.

The drum motor 10 in FIGS. 7 through 10 has a drum tube 11 and a hollow shaft 13 arranged stationarily in space in the interior of the drum tube 11. A bearing and a sealing ring are arranged around the hollow shaft 13. The inner cover 20 is arranged between the bearing, the sealing ring and the inside surface of the drum tube 11. The outer cover 30 is screwed on the surface of the inner cover 20. The design configuration of oil holes 15 and the sealing element 16 can be in accordance with the above-described embodiments or other design configurations.

A coating 19 is arranged on the outside surface of the drum tube 11. The coating 19 is in particular a rubber coating and serves for adjusting the friction depending on the respective area of use of the drum motor 10. The external sealing integrity between the outer cover 30 and the drum tube 11 or the rubber coating 19 is afforded in the FIGS. 7 through 10 embodiment not or not solely by a sealing ring, but by a projection 32 as is illustrated in FIG. 9 showing a detail view of the region B in FIG. 7.

Figure 8:
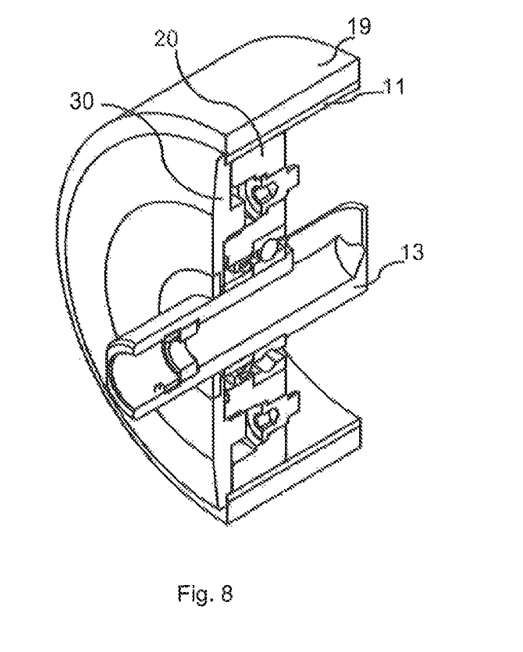
FIG. 8 shows a cross-section through an end region of a drum motor according to the invention.
Figure 9:
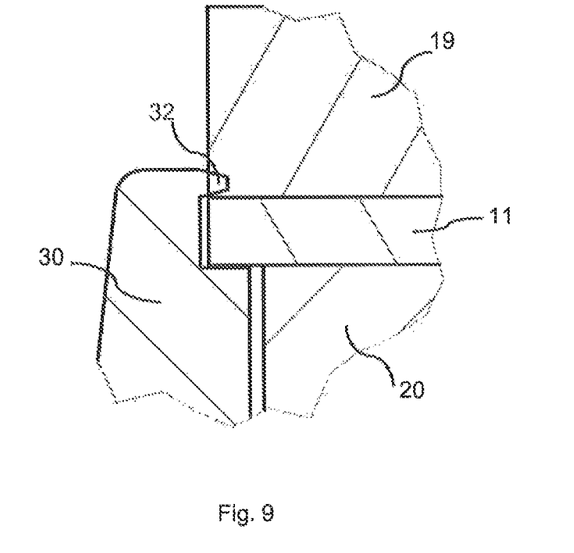
FIG. 9 shows a detail view of the drum motor of FIG. 7.

FIG. 9 shows a drum tube 11, to the inside surface of which the inner cover 20 is fixed by a connection involving intimate joining of the materials concerned. A rubber coating 19 is arranged on the outer surface of the drum tube 11. The outer cover 30 is arranged on the inner cover 20 and the drum tube 11 to cover over the drum tube end and to seal off the interior 12 relative to the exterior. The external sealing integrity is afforded by a projection 32 which engages into the rubber coating 19 or which is received in a recess in the rubber coating 19. It is possible to dispense with the use of a sealing ring 21 in the embodiment of FIGS. 7 through 10.

Figure 7:
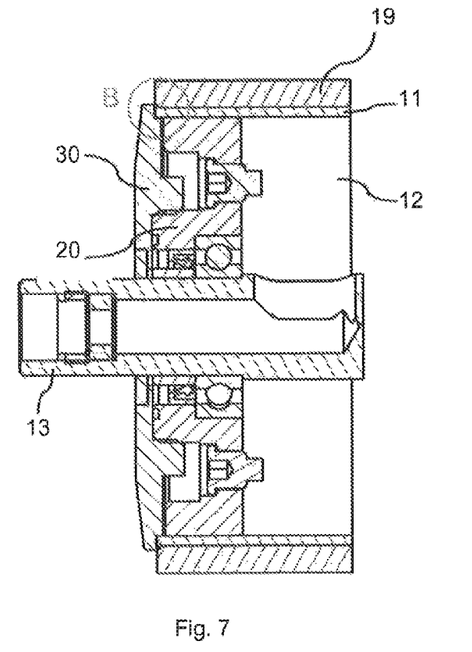
FIG. 7 shows a cross-section through an end region of a drum motor according to the invention.
Figure 10:
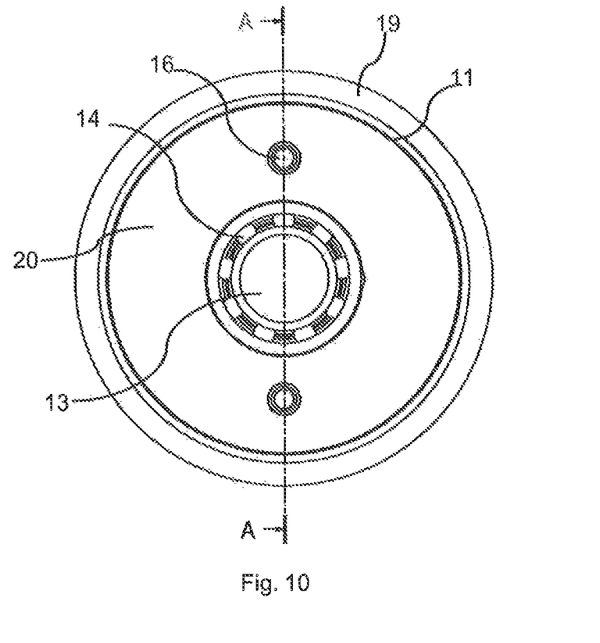
FIG. 10 shows an inside view of the drum motor of FIG. 7.

FIG. 10 shows an inside view of the drum motor of FIGS. 7 through 9, illustrating the section along A-A in relation to FIG. 7. FIG. 10 illustrates the radial arrangement of shaft 13, ball bearing 14, inner cover 20 and drum tube 11. The coating 19 is arranged outside the drum tube 11. In the view shown in FIG. 10 it is possible to see the sealing elements 16 which seal off the oil inlet or passage to the interior 12 of the drum motor.

The invention makes it possible to design the drum motor 10 in such a way that the outer cover 30 can be designed in customer-specific and demand-specific fashion in relation to shape and material, and can be subsequently fitted in place. In particular the drum motor 10 according to the invention makes it possible to use the surface of the outer cover 30, prior to assembly of the drum motor 10 or after assembly of the drum motor 10, for manufacturer-specific or customer branding. Particular requirements, including on the esthetic aspect, can thus be particularly easily met. As the outer cover 30 serves for covering over the drum tube end and for external sealing thereof it can be made virtually from any material, such as for example high-quality steel, plastic, rubber and so forth. According to the invention therefore there is thus provided a hygienic drum motor cover with central closure and choice of external material after assembly.

The invention claimed is:

1. A drum motor (10) comprising:
a drum tube (11) having an interior (12),
a spatially fixed shaft (13) in the interior (12) of the drum tube (11),
an inner cover (20) for accommodating a bearing (14) to support the drum tube (11) rotatably about the shaft (13) and for internally sealing off the interior (12), and
an outer cover (30) for covering a drum tube end and for externally sealing off the interior (12),
wherein the inner cover (20) has at least one oil hole (15),
wherein the oil hole (15) has a thread for receiving a sealing screw (16),
wherein the drum motor (10) has an outer sealing ring (31) between the outer cover (30) and the drum tube (11),
and wherein the drum motor (10) has a sealing ring (17) between the inner cover (20) and the shaft (13).

2. A drum motor (10) as set forth in claim 1, wherein the outer cover (30) and/or the inner cover (20) has a fixing means (21) for releasable arrangement of the outer cover (30) on the inner cover (20).

3. A drum motor (10) as set forth in claim 1, wherein the drum motor (10) has a sealing element (16) arranged sealingly in the oil hole (15).

4. A drum motor (10) as set forth in claim 1, wherein the outer cover (30) has a radial periphery substantially corresponding to the radial periphery of the drum tube (11).

5. A drum motor (10) as set forth in claim 1, wherein the outer cover (30) has a smooth surface.

6. A drum motor (10) as set forth in claim 1, wherein the drum motor (10) has a ball bearing (14) between the shaft (13) and the inner cover (20).

7. A drum motor (10) as set forth in claim 1, wherein the drum motor (10) has a sealing lip (18) between the outer cover (30) and the shaft (13).

8. A drum motor (10) as set forth in claim 1, wherein the shaft (13) is a hollow shaft.

\* \* \* \* \*